United States Patent [19]

Matula

[11] Patent Number: 5,615,113
[45] Date of Patent: Mar. 25, 1997

[54] EARLY SIGNALING OF NO-OVERFLOW FOR NONRESTORING TWOS COMPLEMENT DIVISION

[75] Inventor: David W. Matula, Dallas, Tex.

[73] Assignee: Cyrix Corporation, Richardson, Tex.

[21] Appl. No.: 491,182

[22] Filed: Jun. 16, 1995

[51] Int. Cl.$^6$ .................................................. G06F 7/52
[52] U.S. Cl. ........................................ 364/766; 364/736.5
[58] Field of Search .................................. 364/766, 767, 364/745, 736.5, 761

[56] References Cited

U.S. PATENT DOCUMENTS

| | | | |
|---|---|---|---|
| 4,992,968 | 2/1991 | Adiletta | 364/761 |
| 5,010,511 | 4/1991 | Hartley et al. | 364/786 |
| 5,097,435 | 3/1992 | Takahashi | 364/761 |
| 5,272,660 | 12/1993 | Rossbach | 364/748 |

FOREIGN PATENT DOCUMENTS

| | | |
|---|---|---|
| 0351829 | 1/1990 | European Pat. Off. . |
| 2266607 | 11/1993 | United Kingdom . |

*Primary Examiner*—David H. Malzahn
*Attorney, Agent, or Firm*—Andrew S. Viger; John L. Maxin

[57] ABSTRACT

An early no-overflow signaling system and method is used in conjunction with performing nonrestoring division using two's complement 2n bit dividends N and two's complement n bit divisors D—when a no-overflow condition is signaled, a subsequent plurality of iterative partial remainder computations are performed to obtain the quotient Q and remainder R with no possibility of overflow. Dividends N are characterized by a 2-bit sign field N(s1s2) formed by a first sign bit N(s1) and a second sign bit N(s2), a high order n–1 dividend magnitude bits N(himag), and a low order n–1 dividend magnitude bits N(lomag), such that N(s1) and N(himag) form a 2's complement number N(hi), while divisors D are characterized by a leading sign bit D(s) and n–1 divisor magnitude bits D(mag). Early no-overflow signaling logic uses the input dividend N and divisor D, and a 2n-1 bit first partial remainder (which has a value of $[N-2^{n-1}D]$) obtained by computing an n-bit first partial remainder PR1 corresponding to the first n bits of the first partial remainder of value $[N-2^{n-1}D]$ (including a leading sign bit PR1(s)), such that the first partial remainder of value $[N-2^{n-1}D]$ corresponds to PR1 and N(lomag). No-overflow signaling (illustrated in FIGS. 2a/2b and 4) uses (i) the divisor sign and magnitude D(s) and D(mag), (ii) the two bit sign field of the dividend N(s1s2), (iii) and the first partial remainder of value $[N-2^{n-1}D]$. A no-overflow condition is signaled if (i) the divisor magnitude D(mag) is not equal to zero (FIG. 2a, 102, and FIG. 4, 151), and (ii) the dividend sign bits N(s1) and N(s2) are equal (FIG. 2a, 112, and FIG. 4, 152), and (iii) the sign of the first partial remainder PR1(s) in not equal to the dividend sign bit N(s2) (FIG. 2b, 131, and FIG. 4, 153), and (iv) the divisor and dividend are not both negative (FIG. 2b, 141, and FIG. 4, 154, 156), or if they are, (v) the first partial remainder corresponding to PR1 and N(lomag) is not equal to zero (FIG. 2b, 141, 142, 143, and FIG. 2b, 155, 156).

6 Claims, 7 Drawing Sheets

| EXCEPTIONAL DIVISOR CONTROL ||||||| 
|---|---|---|---|---|---|---|
| CONTROL INPUT ||| CONTROL OUTPUT ||||
| N(s1s2) 2 bits | N(himag) (n-1) bits | N(lomag) (n-1) bits | Range of Results | Quotient n bits | Remainder ||
| | | | | | R(s) 1 bit | R(mag) n-1 bits |
| 00 | x | x | Valid | 2's Comp. (N(hi)) | 0 | N(lomag) |
| 01 | 0 | x | Valid | N(hi) ($=-2^{n-1}$) | 0 | N(lomag) |
| | $\neq 0$ | x | Overflow | x | x | x |
| 10 | x | x | Overflow | x | x | x |
| 11 | 0 | 0 | Overflow | x | x | x |
| | $\neq 0$ | 0 | Valid | 2's Comp (N(hi)) | 0 | N(lomag) (=zero) |
| | x | $\neq 0$ | Valid | 1's Comp (N(hi)) | 1 | N(lomag) |

*FIG. 2C*

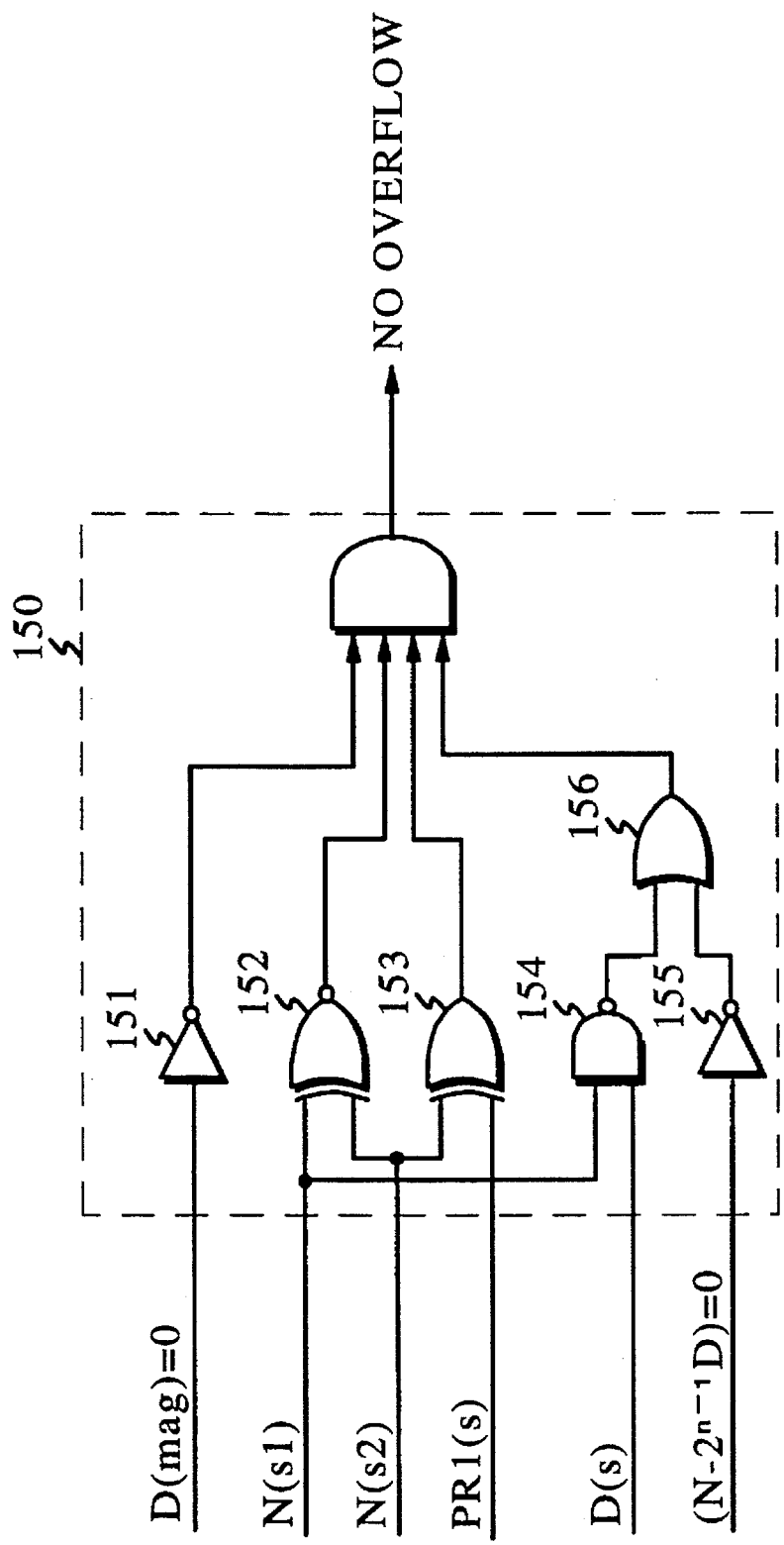

EARLY SIGNALING OF NO-OVERFLOW FOR NONRESTORING TWOS COMPLEMENT DIVISION

CROSS REFERENCE TO RELATED APPLICATIONS

This patent is related to two commonly assigned U.S. Pat. applications (a) Ser. No. 08/064,507, titled "Method of Detecting Anomalous Overflow Conditions For Negative Quotients In Nonrestoring Twos Complement Division", filed May 18, 1993, now abandoned, and (b) Ser. No. 491,176, titled "Early Overflow Detection For Nonrestoring Two's Complement Division", filed Jun. 16, 1995, the disclosures of which are incorporated by reference.

BACKGROUND

1. Technical Field

The invention relates generally to computers and data processing systems, and more particularly relates to numeric processing including subtractive division computations.

In even greater particularity, the invention relates to detecting overflow conditions in nonrestoring two's complement division.

2. Related Art

Microprocessor architectures include execution units that perform basic arithmetic operations such as addition, subtraction, multiplication, division, and shifting. These operations may use either signed or unsigned numbers—in the case of signed integers (where the most significant bit is the sign bit), the most common form of representation is two's complement. Sign-magnitude is also used, in particular for floating point computations following the IEEE 754 Floating Point standard.

For division, the common approach is to use a subtractive division algorithm that implements shift-and-subtract division, such as nonrestoring division, although some processor architectures (typically, floating point processors) implement division algorithms where multiplication is the iterative operator. Basically, conventional nonrestoring integer division involves iteratively subtracting an n bit divisor from an appropriately shifted 2n bit dividend to obtain an n bit quotient and an n bit remainder. By convention, any non-zero remainder should be of the same sign as the dividend and smaller in magnitdue than the divisor.

Overflow should be signaled if the values of the 2n bit dividend and the n bit divisor are such that the quotient won't fit in n bits. In particular, two types of overflow can occur: (a) absolute overflow where either the divisor is zero or the dividend is so large (in absolute value) as to guarantee overflow for any n bit divisor, and (b) relative overflow where a given dividend is too large relative to a given divisor.

Without limiting the scope of the invention, this background information is provided in the context of a specific problem to which the invention has application: for conventional nonrestoring division using two's complement integers, detecting and signaling overflow conditions as soon as possible.

Nonrestoring division using a subtractive division algorithm implements a variation of basic pencil-and-paper division—in successive iterative steps, after appropriate shifting, the divisor is iteratively subtracted from the dividend or partial remainder to obtain a quotient digit and a new partial remainder, finally obtaining a full quotient and a final remainder that is zero or at least smaller in magnitude than the divisor.

The basic process is (assuming positive dividend and divisor): (a) loading the 2n bit dividend into a double length register and the n bit divisor into a single length register aligned with the most significant n bits (or high order part) of the dividend, (b) in a first iterative step, subtracting the divisor from the high order part to obtain a first partial remainder no larger than 2n−1 bits, and (c) in successive iterative steps, left shifting the partial remainder and either (i) subtracting the divisor if the partial remainder is positive, or (ii) adding the divisor if the partial remainder is negative. The general principle is that each iteration should bring the allowable range of the partial remainder closer to zero, i.e., the iterative process is repeated until the partial remainder converges to a final remainder that is zero or at least smaller in magnitude than the divisor.

For negative quotients (either dividend or divisor negative), the general principle remains that each iteration should bring the alowed range of the partial remainder closer to zero. Thus, the first iterative step requires an addition (of two oppositely signed numbers), followed by successive iterative steps in which the divisor is added or subtracted from the partial remainder depending on the their signs.

Overflow detection depends on the type of nonrestoring division being implemented: (a) unsigned, (b) signed magnitude, or (c) two's complement. Absolute overflow may be determined by inspection of the dividend and/or divisor before commencing the iterative subtractive operations. Determination of instances of relative overflow are usually made after the first and/or after the last iterative subtraction, depending on the type of nonrestoring division implemented.

For unsigned integer divide, the 2n bit dividend and the n bit divisor are both magnitude fields:

$0 \leq \text{Dividend} \leq 2^{2n}-1$ $0 \leq \text{Divisor} \leq 2^n-1$

The overflow test is based on the sign bit of the first partial remainder PR1(s), which is equal to:

[0] if Dividend$-2^n\times$Divisor$\leq 0$

[1] if Dividend$-2^n\times$Divisor$< 0$ (multiplying by $2^n$ corresponds to shifting the Divisor left by n bits).

If PR1(s)=[0] (non-negative), then either (i) the divisor is zero, or (ii) the quotient will be greater than or equal to $2^n$, which overflow—if PR1(s)=[1] (negative), the quotient must be strictly less than $2^n$, and overflow cannot occur. Thus testing the negative or non-negative status of the difference [Dividend$-2^n\times$Divisor] provides a simple early overflow test (i.e., a test that can be completed prior to computing the computing the second partial remainder).

In practice, the subtraction determining PR1(s) can be effected by adding the n bit two's complement of the divisor to the leading n bits of the dividend, with the complement of the carry out corresponding to the sign bit PR1(s) (this use of complement carry out prevails for all successive partial remainder sign computations as the associated iterative subtraction or addition steps are effectively additions of oppositely signed values). Note that if sign extension by one bit could be used (i.e., if the dividend and divisor registers were correspondingly extended by one bit each to provide a leading sign bit position), then the effective sum of the dividend and complemented divisor in the extended sign position would become [0+1+(carry out)] which is equivalent to using complement carry out as the sign bit PR1(s).

For sign magnitude type integer divide, the 2n bit dividend has a sign bit and [2(n−1)+1] magnitude bits, such that:

$$|\text{Dividend}| \leq 2^{2n-1}-1$$

while the divisor has a sign bit and (n–1) magnitude bits, such that:

$$|\text{Divisor}| \leq 2^{n-1}-1$$

Note that the dividend here has twice the number of magnitude bits of the divisor plus one extra leading magnitude bit.

Two implementations of the iterative subtractive operation can be used, both of which are able to signal overflow prior to computing the second partial remainder.

The first implementation uses an (n–1) bit adder, and requires two overflow tests, selected by testing the most significant magnitude bit (MSB) of the dividend (the extra magnitude bit): (a) for MSB=1, a range exception (indicative of absolute overflow) exists and overflow is signaled, and (b) for MSB=0, overflow is signaled if the resulting sign of the first partial remainder (complement carry out) is non-negative. For the latter case, the dividend and divisor signs are shifted out along with the dividend MSB, leaving an unsigned 2(n–1) bit dividend and unsigned (n–1) bit divisor, transforming the iterative subtractive operation into (n–1) bit unsigned divide (the dividend and divisor signs are used after the iterative subtractive steps to determine the signs of any non-zero quotient and remainder).

The second implementation uses an n bit adder, and requires only one overflow test. The sign of the dividend is shifted out to obtain an unsigned 2n–1 bit dividend, and the divisor sign is extracted and replaced by a zero to obtain an unsigned n bit divisor. The first partial remainder is formed by two's complement addition using the n-bit adder, and overflow is signaled if the resulting sign (the complement of the carry out) is non-negative.

Signaling overflow for two's complement nonrestoring integer division is more problematic. Because the range of allowed n bit quotients is asymmetric—$(-2^n)$ to $+(2^n-1)$—anomalous overflow conditions can occur.

A common approach to resolving the distinction between whether a legitimate quotient of $-2^n$ is obtained or whether a negatively directed overflow corresponding to a quotient of $\leq -(2^n+1)$ has occurred is to perform a final overflow test, i.e., after the iterative subtractive step has obtained a final quotient and remainder. See, for example, "Introduction to Arithmetic For Digital Systems Designers", S. Waser and M. Flynn, (Pub. 1982 CBS College Publishing) ("Flynn").

The overflow technique in Flynn fails to detect an anomalous absolute overflow condition that can occur where the 2n bit dividend is so large that for any n bit divisor overflow must occur. The first related application describes an overflow detection technique that includes two overflow detection tests: (a) an early overflow detection for this anomalous overflow condition, i.e., determining if the first partial remainder is sufficiently large in magnitude that overflow must occur for any n-bit divisor, and (b) a second overflow detection test (such as taught in Flynn) to signal overflow after the iterative divide operation is complete and an adjusted signed quotient is obtained. In one embodiment, overflow is signaled if complement carry out from the n-bit subtraction that computes the first partial remainder is not the same as the most significant bit of the first partial remainder.

This overflow detection technique taught by the first related application requires a final overflow detection test that is not performed until after the iterative divide operations are complete, a delay involving on the order of n iterations for n bit division. The delay for final resolution of overflow can create an unnecessary bottleneck in systems that allow parallel instruction execution with out-of-order completion but require exceptions to be signaled in order (i.e., precise exceptions) such that a delay in determining whether a computation will cause an overflow exception will prevent other completed instructions from retiring.

Alternative overflow tests for nonrestoring two's complement division are disclosed in European Patent 351,829 (to Yamahata) and U.S. Pat. No. 5,317,531 (to Zaidi). Both of these references use the dividend and divisor signs for a final determination of quotient sign. The operable dividend and divisor values are complemented as needed to obtain positive magnitudes, and 2n by n bit unsigned division is performed—a final overflow test after determining a final quotient magnitude is performed to resolve the distinction between the legitimate quotient $-2^n$ and other quotient overflow values. These overflow tests similarly involve an order of n iteration delay in resolving overflow detection.

U.S. Pat. No. 5,097,435 (to Takahashi) discloses three implementations for multiple-step overflow detection for nonrestoring two's complement division: (a) testing for a zero result, and if the result is not zero signaling overflow based on an XNOR of the dividend sign and the carry out (see, FIG. 2a–2b), (b) determining whether the dividend and the divisor have the same sign, and the MSB of a quotient is equal to one (see, FIG. 5), and (c) determining during each iterative cycle for computing a next quotient bit whether for oppositely signed dividend and divisor the quotient bit and MSB-of-quotient bit are both one (FIG. 5). Each of these overflow tests are not sufficient to determine all cases of overflow prior to the computation of the second partial remainder.

Thus, currently available overflow detection techniques for two's complement nonrestoring integer division require that numerous iterative shift-and-subtract operations be completed before all cases of overflow can be detected (and/or before it can be detected that overflow will not occur). Completing these iterative operations typically requires on the order of 32 clocks for 64 bit dividends and 32 N bit divisors.

SUMMARY

An object of the invention is to provide early signaling of no overflow during nonrestoring division using two's complement integers, to enable a no-overflow condition to be detected and signaled as soon as possible (preferably prior to or in parallel with the computation of the second partial remainder).

These and other objects of the invention are achieved by an early no-overflow signaling system and method used in conjunction with performing nonrestoring division using two's complement 2n bit dividends and two's complement n bit divisors. Input dividends N are characterized by a 2-bit sign field N(s1s2) formed by a first sign bit N(s1) and a second sign bit N(s2), a high order n–1 dividend magnitude bits N(himag), and a low order n–1 dividend magnitude bits N(lomag), such that N(s1) and H(himag) form a 2's complement number N(hi). Input divisor D are charcterized by a leading sign bit D(s) and n–1 divisor magnitude bits D(mag).

Early no-overflow signaling logic uses the input dividend N and divisor D, and a 2n–1 bit first partial remainder, which has a value of $[N-2^{n-1}\ D]$—when a no-overflow condition is signaled, a subsequent plurality of iterative partial remainder computations are performed to obtain the quotient Q and remainder R with no possibility of overflow.

In one aspect of the invention, early overflow signaling is implemented in an interative divide system. In a first operation, iterative divide circuitry computes the difference between N(hi) and D to obtain an n-bit first partial remainder PR1 corresponding to the first n bits of the first partial remainder of value $[N-2^{n-1} D]$ including a leading sign bit PR1(s), such that the first partial remainder of value $[N-2^{n-1} D]$ corresponds to PR1 and N(lomag).

No-overflow signaling logic receives (i) the divisor sign and magnitude D(s) and D(mag), (ii) the two bit sign field of the dividend N(s1s2), (iii) and the first partial remainder of value $[N-2^{n-1} D]$. The no-overflow signaling logic includes zero detect logic that detects whether both the divisor magnitude D(mag) and the first partial remainder are zero.

The no-overflow signaling logic signals a no-overflow condition if (i) the divisor magnitude D(mag) is not equal to zero, and (ii) the dividend sign bits N(s1) and N(s2) are equal, and (iii) the sign of the first partial remainder PR1(s) in not equal to the dividend sign bit N(s2), and (iv) the divisor and dividend are not both negative, or if they are, (v) the first partial remainder corresponding to PR1 and N(lomag) is not equal to zero.

In another aspect of the invention, the iterative division system includes divide-by-zero logic that signals a divide-by-zero condition if D(mag) and D(s) are both equal to zero.

Embodiments of the invention may be implemented to realize one or more of the following technical advantages. Signaling a no-overflow condition early in the division computation indicates that the computation will complete without causing an overflow exception. Such no-overflow signaling for a senior division computation allows junior instruction that do not require as many clocks to complete and retire because the senior division computation will not cause an exception (allowing precise exceptions to be maintained). In addition, an early overflow detection technique can be used to determine overflow early (i.e., prior to or in parallel with the computation of the second partial remainder) for all cases, so that the typical multi-cycle delay for a division computation is only incurred for cases where a quotient without overflow is guaranteed.

For a more complete understanding of the invention, and for further features and advantages, reference is now made to the Detailed Description of an exemplary embodiment of the invention, together with the accompanying Drawings, it being understood that the invention encompasses any modifications or alternative embodiments that fall within the scope of the claims.

DRAWINGS

Figure 2A:
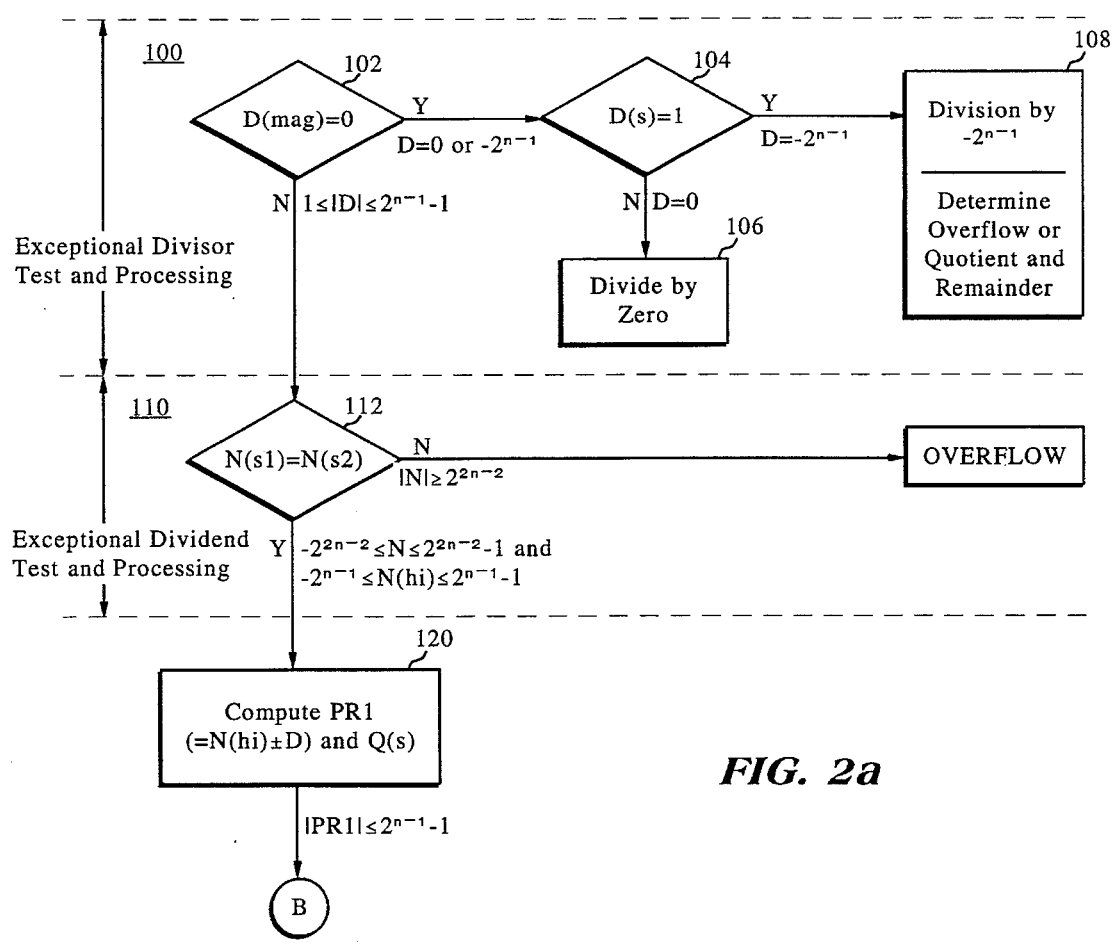
Figure 2B:
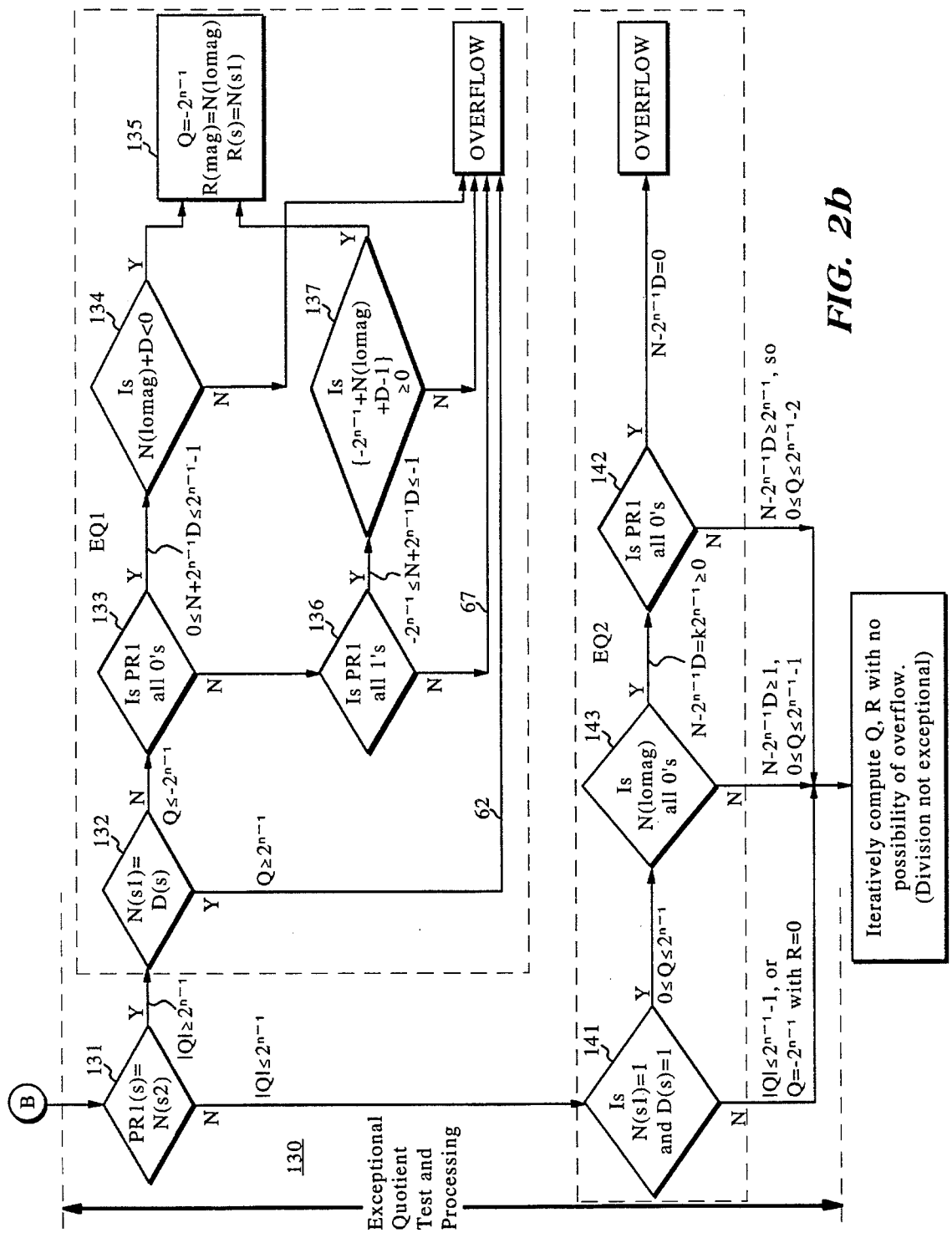

FIGS. 2a and 2b illustrate the exemplary early overflow detection technique, including (2a) the exceptional divisor test and the exceptional dividend test, and (2b) the exceptional quotient test, which according to aspects of the invention are able to signal all cases of overflow before computation of the second partial remainder as well as provide a final quotient and remainder pair for certain exceptional divisors and exceptional quotients that do not result in overflow.

FIG. 2c illustrates the exceptional divisor control logic used in implementing the exemplary exceptional divisor overflow test.

Figure 3:
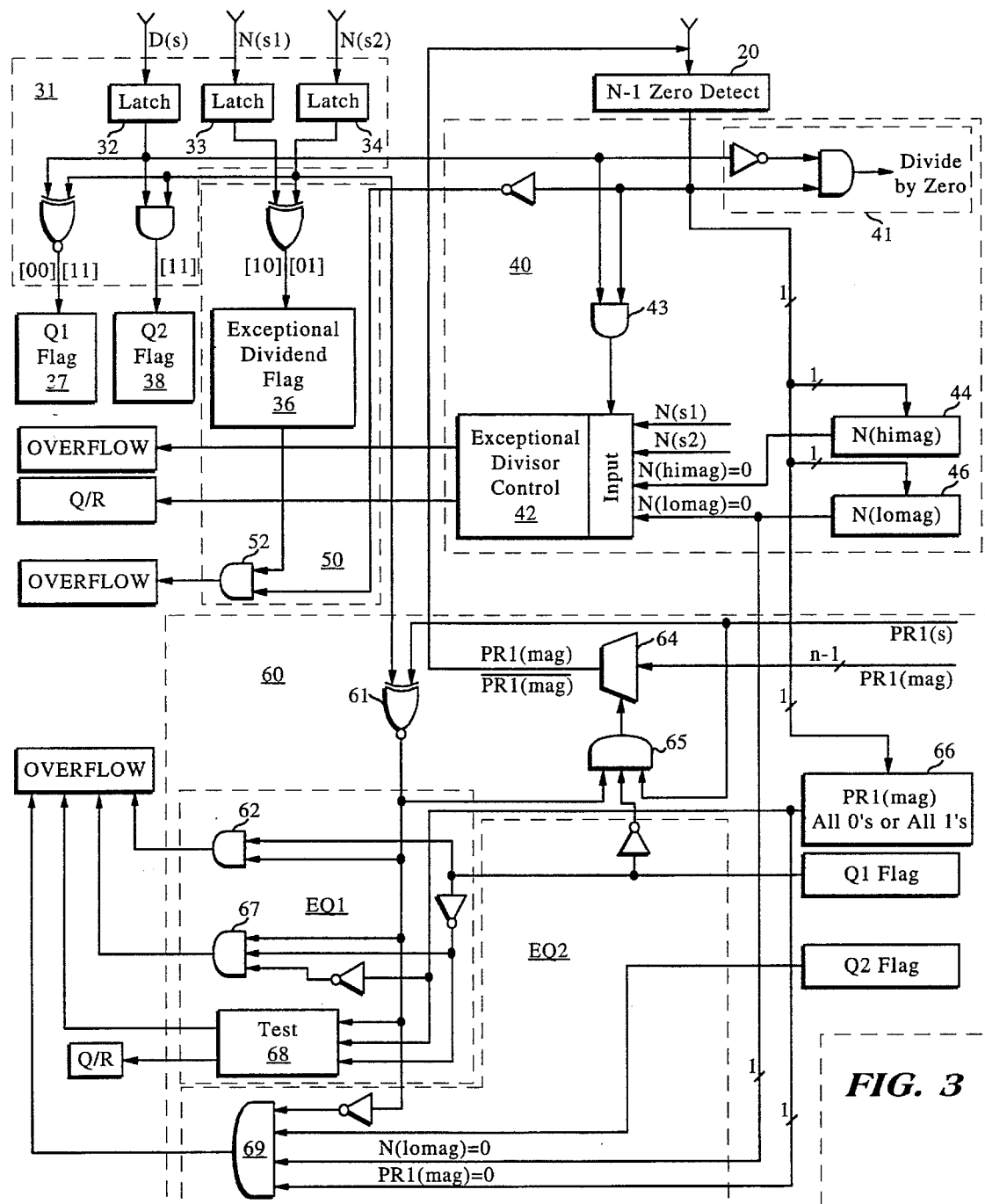

FIG. 3 illustrates the exemplary early overflow detection logic, including the exceptional divisor circuitry that implements the exceptional divisor test (including providing a final quotient/remainder pair for certain exceptional divisors that do not result in overflow), the exceptional dividend circuitry, and the exceptional quotient circuitry (including providing a final quotient/remainder pair for certain exceptional quotients that do not result in overflow).

FIG. 4 illustrates the exemplary technique for signaling a no-overflow condition, which is embodied in the exemplary early overflow detection technique illustrated in FIGS. 2a and 2b, and in the exemplary early overflow detection logic illustrated in FIG. 3.

DETAILED DESCRIPTION

The detailed description of an exemplary embodiment of the early overflow detection logic is organized as follows:

1. Nonrestoring Division
    1.1 Terminology
    1.2 Iterative Divide Operations
2. Early Overflow Detection
    2.1 Exceptional Divisor
    2.2 Exceptional Dividend
    2.3 Exceptional Quotient
3. Early Overflow Detection Logic
    3.1 Exceptional Divisor Circuitry
    3.2 Exceptional Dividend Circuitry
    3.3 Exceptional Quotient Circuitry
4. Early Signaling No Overflow
5. Conclusion This organizational outline, and the corresponding headings, are used in this Detailed Description for convenience of reference only.

The exemplary early overflow detection and no-overflow signaling logic is used in two's complement nonrestoring integer division, such as in the execution unit of a 32 bit microprocessor. Detailed descriptions of conventional or known aspects of two's complement nonrestoring integer division hardware are omitted so as to not obscure the description of the invention with unnecessary detail.

1. Nonrestoring Division

Figure 1A:
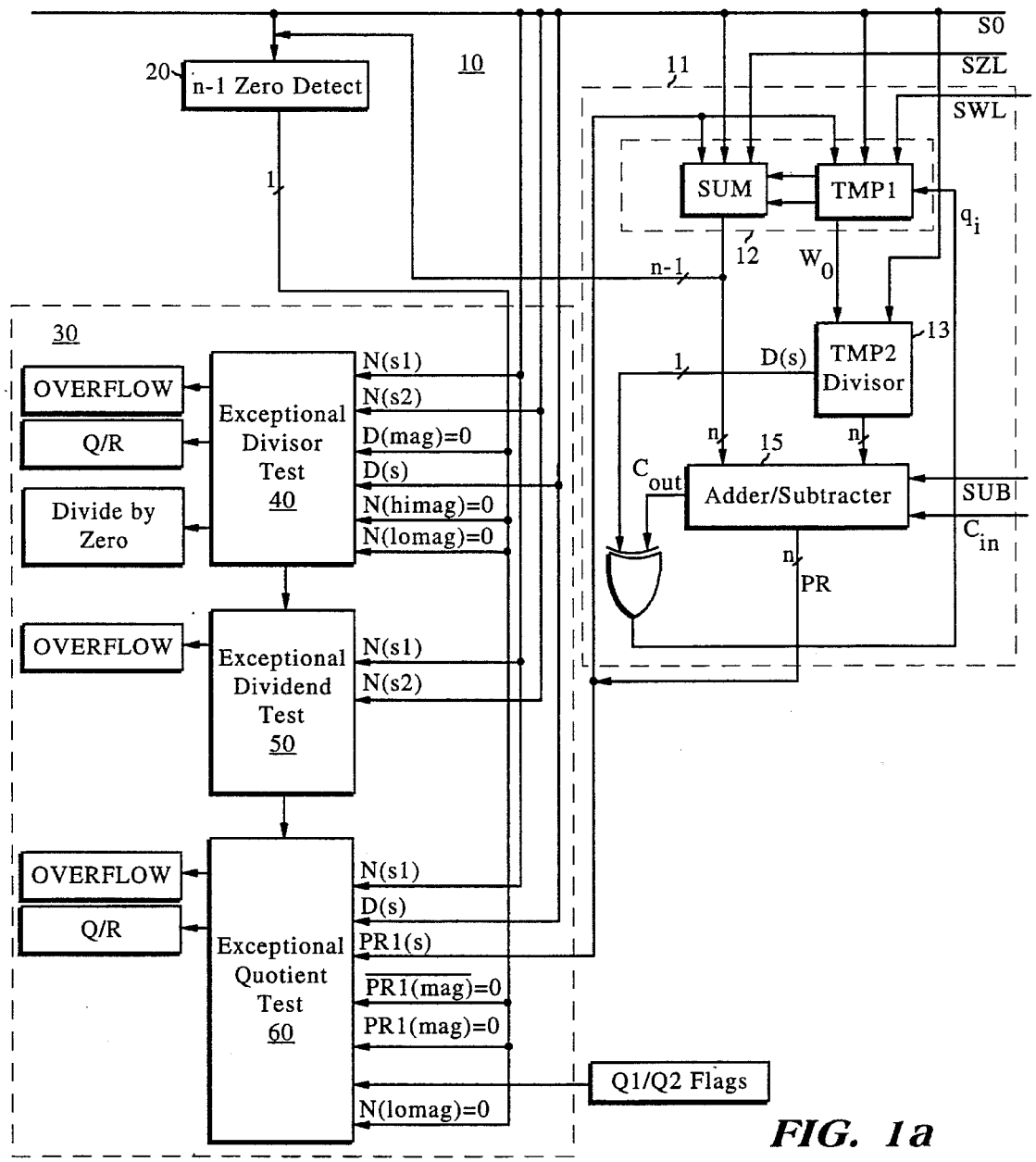
FIG. 1a illustrates an exemplary hardware implementation for nonrestoring two's complement division, together with early overflow detection logic according to the invention.

FIG. 1a illustrates an exemplary hardware implementation for nonrestoring two's complement integer division, including early overflow detection and early no-overflow signaling logic according to the invention. Division hardware 10 includes iterative divide logic 11, an n-1 zero detector 20, and early overflow detection logic.

Exemplary division hardware 10 includes conventional iterative divide logic 11 comprising a 2n-bit dividend (or numerator) register 12, an n-bit divisor register 13, and an adder/subtracter 15. In the exemplary n=32 bit implementation, the 2n-bit dividend register 12 is formed by two 32 bit registers SUM and TMP1. The 2n-bit and n-bit registers 12 and 13 are respectively loaded with the dividend and divisor values from a source bus S0.

Adder/subtracter 15 performs the iterative add/subtract operations used to implement two's complement nonrestoring division. Each iteration, n-bit (high order) partial remainders PR are fed back to the high order n bits of the dividend register 12 (i.e., into the SUM register).

For the exemplary embodiment, adder/subtracter 15 is able to perform, in addition to two's complementation, one's complementation. Also, the output of the adder/subtracter can be selectively routed to the low order n bits of the divident register 12 (i.e., into the TMP1 register).

The dividend register 12 (SUM and TMP1 registers) perform the shift operations associated with the iterative add/subtract operations. Quotient digist $q_i$ are shifted into the least significant end of the dividend register 12, i.e., the TMP1 register—at the completion of a division computation, the SUM register will hold the n-bit 2's complement quotient Q and the TMP1 register will hold the n-bit 2's complement remainder R.

The n-1 zero detector 20 is used in connecton with the exemplary early overflow detection logic 30 in implementing early overflow detection tests. In particular, a conventional divide-by-zero test is performed to detect the exceptional divisor equal to zero.

The exemplary early overflow detection logic 30 implements three early overflow detection tests (Sections 2 and 3)—(a) an exceptional divisor test, performed by exceptional divisor logic 40, (b) an exceptional dividend test, performed by exceptional dividend logic 50, and (c) an exceptional quotient test, performed by exceptional quotient logic 60. In another aspect of the invention, the exemplary overflow detection logic is able to signal a no overflow condition to indicate that the division operation will be performed by iterative partial remainder computations to obtain a final quotient/remainder pair with no possibility of overflow (Section 4).

1.1. Terminology

Figure 1B:
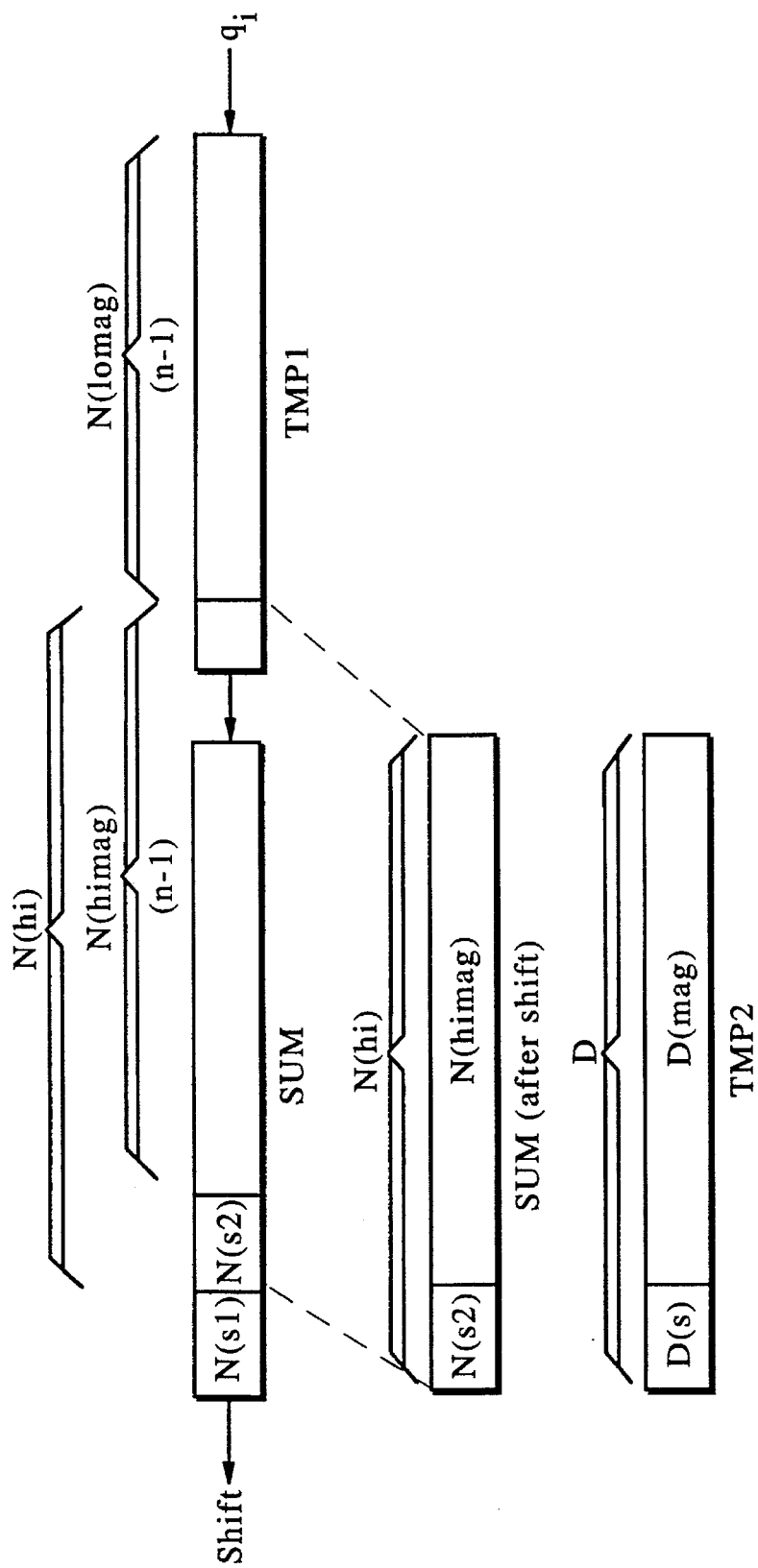
FIG. 1b illustrates the bit assignments for the 2n bit dividend registers and the n divisor register included in the exemplary division hardware.

FIG. 1b illustrates the bit assignments for the 2n-bit dividend register 12 and the n-bit divisor register 13. The following terminology will be used in describing the early overflow detection technique.

The 2n-bit 2's complement dividend, which is stored in the high order SUM register and the low order TMP1 register, is designated the numerator N, and includes a 2-bit sign field N(s1s2) including a first sign bit N(s1) (which is the actual sign bit of the dividend) and a second sign bit N(s2). These sign bits are followed by n-1 high magnitude bits N(himag), and then n-1 low magnitude bits N(lomag).

The second sign bit N(s2) and the n-1 N(himag) bits form an n-bit 2's complement number N(hi) used in the computation of the first partial remainder PR1. Note that N(hi) is the value formed in the high order SUM register after the leading sign bit N(s1) is shifted out, and the leading bit from the low order TMP1 register is shifted into the least significant bit position.

The n-bit 2's complement divisor is stored in the TMP2 register and designated the divisor D, and includes a leading sign bit D(s), followed by n-1 magnitude bits D(mag).

1.2. Iterative Divide Operations

According to conventional two's complement nonrestoring integer division, a quotient Q is obtained by iteratively adding/subtracting the properly aligned divisor and the partial remainder (initially the dividend) to obtain successive n-bit (high order) partial remainders PR, yielding a quotient bit each iteration. The partial remainders PR have a sign bit PR(s) and n-1 magnitude bits PR(mag). The sign bit of a non-zero quotient Q(s) is determined by the sign bits of the dividend and divisor.

Referring to FIGS. 1a and 1b, successive partial remainders PR are formed by adding or subtracting (i.e., two's complementing and then adding) the divisor (TMP2 register) and: (a) for the first partial remainder PR1, N(hi), i.e., the two's complement number left in the SUM register after the dividend's first sign bit N(s1) is shifted out (illustrated in FIG. 1b), and (b) for successive partial remainders, a new N(hi) formed by feeding back the partial remainder PR into the SUM register and shifting left (i.e., shifting out the leading sign bit PR(s) and shifting in the leading bit from the TMP1 register). Each iteration, a next quotient bit is shifted in to the least significant bit of the TMP1 register to form the quotient Q.

In conventional two's complement nonrestoring integer division, two exceptional conditions have to be signaled—divide-by-zero and overflow. Regarding overflow, as described in the Background current overflow tests are not completed until after the iterative divide operations are completed.

2. Early Overflow Detection

The early overflow detection technique of the invention allows overflow testing to be completed prior to computing the second partial remainder. Specifically, overflow is detected for all exceptional cases that can result in overflow—exceptional divisors, exceptional dividends, and exceptional quotients. The exceptional divisor and exceptional dividend tests are performed using the input dividend and the input divisor, while the exceptional quotient test can be completed using the results of the computation of the first partial remainder PR1.

Thus, after the computation on the first partial remainder, the early overflow detection technique is, in all cases, able to either (a) signal an overflow condition, or (b) signal that an overflow exception will not occur. In addition, the exemplary early overflow detection technique is able to complete the computation of a quotient and remainder pair for those cases of exceptional divisors, dividends, and quotients that do not result in overflow.

FIGS. 2a and 2b illustrate the exemplary early overflow detection technique. FIG. 2a illustrates the exceptional divisor test and the exceptional dividend test, while FIG. 2b illustrates the exceptional quotient test.

2.1. Exceptional Divisor

Referring to FIG. 2a, the exceptional divisor test (100) is performed to detect exceptional divisor D that have either of the extreme values zero or $-2^{n-1}$.

A conventional divide-by-zero test is performed to detect a zero exceptional divisor. If the n-1 D(mag) bits are zero (102) and the divisor sign bit D(s) is zero (104), then a divide-by-zero exception is signaled (106). This test is typically performed in parallel with initiating the division computation (i.e., in parallel with the computation of the first partial remainder).

If D(mag) is zero (102) and D(s) is [1] (104), D is the exceptional divisor $-2^{n-1}$, then (108) either overflow is signaled, or a final quotient/remainder pair is provided without the need for any iterative operations. Since division by $-2^{n-1}$ is effectively an n-1 bit shift and two's complement, iterative cycles are replaced by control logic that either determines out-of-range overflow conditions, or assigns the appropriate sign to (a) the quotient, which has a magnitude of N(himag) adjusted by unity for a negative remainder, and (b) the remainder, which always has its 2's complement format magnitude field given by N(lomag) (by convention the sign of a nonzero remainder is the same as the sign of the dividend).

FIG. 2c illustrates the exceptional divisor control function for an exceptional divisor of value $-2^{n-1}$. The inputs to the control function are derived from the dividend—the 2-bit sign field N(s1s2), and if necessary, separate indications of whether the n–1 N(himag)bits and/or the n–1 N(lomag) bits are all zero.

In particular, for a non-negative dividend, i.e., N(s1) is zero, the valid quotients are either (a) N(hi), or (b) the two's complement of N(hi), depending upon the sign bit N(s2) of N(hi)—by convention, the remainder has a sign bit that is also non-negative, with a magnitude of N(lomag). For a negative dividend, i.e., N(s1) is one, the valid quotients are either the two's complement or one's complement of N(hi), depending upon whether the remainder is zero (requiring, according to the convention, a non-negative sign bit) or N(lomag) with a sign bit of one—in the latter case, the determination of a negative remainder also requires a quotient adjustment that is accomplished by using the one's complement of N(hi) to obtain the valid quotient.

Thus, for the exceptional divisor $-2^{n-1}$, valid quotient/remainder pairs are obtained using the input values N(hi) for the quotient and N(lomag) for the remainder, with appropriate complementation and remainder sign bit selection.

Note that the more time-consuming test for whether N(himag) is zero can be conditioned on N(s2)=[1], and the more time-consuming test for whether N(lomag) is zero can be conditioned on N(s1s2)=[11]. Note also that, while it will not be uncommon for N(himag) to be zero, it will be uncommon in practice for N(lomag) to be zero. In any event, if the tests for N(himag) and N(lomag) being zero have to be performed, they will nevertheless be significantly less time consuming than completing the order of n iterative operations to determine overflow or obtain a quotient/remainder pair for this exceptional divisor by previous methods.

Finally, note that the only exceptional divisor test that is in the critical path of non-exceptional iterative divide is the D(mag)=[0] test, which is required for the conventional divide-by-zero test.

2.2 Exceptional Dividend

Referring to FIG. 2a, if the n–1 D(mag) bits are not all zero, then the divisor is not exceptional, and the exceptional dividend test (110) is performed. This test detects whether the dividend (numerator) N is too large for any unexceptional divisor D.

Specifically, this test is implemented by testing whether the two sign bits are equal (112) (i.e., N(s1s2)=[11] or [00]). If both sign bits are equal, N(s1) is a sign extension that may be truncated so that N(s2) is the sign bit of N(hi). N(hi) is then the value obtained by left shifting the dividend prior to computing the first partial remainder (such that PR1 is N(hi)±D)—this initial left shift shifts off the (extended) dividend sign N(s1) (see, FIG. 1b).

If the two sign bits N(s1) and N(s2) are not equal, such that N(s1) is not the sign extension of N(s2), then overflow is signaled because the magnitude of the dividend is too large for any unexceptional divisor. If N(s1) is the sign extension of N(s2), such that shifting out N(s1) does not result in the loss of any data, then the dividend is within a range over which valid quotients may be obtained—further overflow signaling depends on detecting exceptional quotients where the dividend is determined to be too large relative to the particular divisor.

Note that the exceptional divisor and exceptional dividend tests are performed using only the divisor and dividend, and can be performed in parallel with the first partial remainder computation. In accordance with the invention, if these input argument tests do not detect an overflow condition, all remaining overflow conditions can be detected using the results of the computation of the first partial remainder PR1 (120), without the need to compute a second or successive iterative partial remainder.

2.3. Exceptional Quotient

Referring to FIG. 2b, the exceptional quotient test (130) involves two separate tests: (a) a first exceptional quotient test EQ1 corresponding to the first partial remainder sign bit being the same as the dividend sign, where the fact that $|N| \geq 2^{n-1}|D|$ means that the quotient magnitude is at least $2^{n-1}$, denoting overflow in all cases except $Q=-2^{n-1}$ with an appropriately bounded remainder, and (b) a second exceptional quotient test EQ2 corresponding to the first partial remainder sign bit differing from the dividend sign, where the fact that $|N| \leq 2^{n-1}|D|$ means that the quotient magnitude is at most $2^{n-1}$, denoting no overflow in all cases except $Q=+2^{n-1}$ with the dividend having been negative and the full first partial remainder $N+2^{n-1}D$ being exactly zero. For a given dividend, the determination of which exceptional quotient test applies depends on the sign bit PR1(s) of the first partial remainder PR1=N(hi)±D.

Specifically, selection between the two exceptional quotient tests EQ1 and EQ2 depends on whether (131) the sign bit of the first partial remainder PR1 is equal to the sign bit of N(hi), i.e., N(s2). This test determines whether in computing the first partial remainder PR1, the sign bit changes (indicating that $|Q| \leq 2^{n-1}$).

If the computation of PR1 does not result in a sign change $(|Q| \geq 2^{n-1})$, then the first exceptional quotient test EQ1 either signals overflow, or for one exceptional quotient value $(Q=-2^{n-1})$, provides a final quotient/remainder pair (thereby completing the division operations). If the computation of PR1 does not result in a sign change, then the second exceptional quotient test is used to investigate one remaining overflow condition —$Q=2^{n-1}$ with zero remainder ($N-2^{n-1}D=0$). If the second exceptional quotient test does not detect overflow, a no overflow condition can be signaled (see, Section 4), and the time consuming order of n iterations of the iterative divide operation can be performed to obtain a final quotient and remainder pair without any possibility of overflow.

The first exceptional quotient test EQ1 involves first determining (132) whether N(s1) and D(s) are equal—if so, the quotient Q is positive and greater than or equal to $2^{n-1}$ which is overflow. If N(s1) and D(s) are not equal, then the quotient Q is negative less than or equal to $-2^{n-1}$. Further investigation is necessary to determine either (a) that $Q=-2^{n-1}$ with an appropriate remainder, or (b) that $Q<-2^{n-1}-1$ which is overflow. Then the n bits of PR1 are inspected to determine if they are all zeros (133) or all ones (136), effectively making PR1 a sign extension of the n–1 bit magnitude field N(lomag). If not, then the quotient Q will be less than or equal to $-(2^{nA}+1)$, which is overflow.

That is, when PR1 is all zeros (133), then $$0 \leq N+2^{-1}D \leq 2^{n-1}-1$$

and N(lomag) is tested (134) to determine if $$N+2^{n-1} \leq D \leq |D''|-1$$

confirming that $N+2^{n-1}D$ is a remainder for the legitimate quotient $Q=-2^{n-1}$ (135). When PR1 is all ones (136), then $$-2^{n-1} \leq N+2^{n-1}D \leq -1$$

and noting that $$N+2^{n-1}D=-2^{n-1}+n(logmag)$$

N(lomag) is tested (137) to determine if $$-D+1 \leq -2^{-1}+N(lomag) \leq -1$$

confirming that this term is a remainder for the legitimate quotient $Q=-^{n-1}$. When $$N+2^{n-1}D$$

is not a legitimate remainder for the proposed quotient $Q=-2^{n-1}$, then $$Q \leq -2^{n-1}-1$$

which is overflow.

The second exceptional quotient test EQ2 is invoked when the sign bit of PR1 is different from that of the dividend (131)—it is used to detect a final overflow condition that occurs when three conditions are met: the dividend and divisor are both negative (141), and both PR1 and the n−1 N(lomag) bits that were not used in the computation of PR1 are all zeros (142 and 143). If so, the 2n−1 bit first partial remainder of value $N-2^{n-1}D$ (which is actually the concatenation of PR1 and the n−1 N(lomag) bits) is equal to zero, which yields the exact quotient $+2^{2-1}$ with zero remainder, which is overflow.

Absent this final overflow case, iterative computation of quotient digits and partial remainders can be pursued withou possibility of overflow.

For the exemplary exceptional quotient test, if the dividend and divisor are not bot h negative (141), then the zero tests for PR1 and N(logmag) (142 and 143) are not performed, and the division operation proceeds with iterative partial remainder computations to obtain a final quotient/remainder pair without possibility of overflow (i.e., a no overflow condition cna be signaled). Alternatively, the zero tests for PR1 and N(lomag) could still be performed to detect early (i.e., without the need to wait for iterative computations) the unusual quotient/remainder pair $Q=-2^{n-1}$ with R=0 (which is allowed in 2's complement but not in signed magnitude).

3. Early Overflow Detection Logic

Referring to FIGS. 1a and 3, the exemplary early overflow detection logic 30 includes exceptional divisor cirucitry 40, exceptional dividend circuitry 50, and exceptional quotient circuitry 60.

The exceptional divisor circuitry 40 selectively receives as inputs the divisor sign D(s), the two dividend sign bits N(s1) and N(s2), and from the zero detect circuit 20, indications of whether (a) the divisor magnitude D(mag) is all zero, and (b) the n−1 high and low magnitude bits N(himag) and N(lomag) of the dividend are all zeros.

The exceptional dividend circuitry 50 selectively receives as inputs the two dividend sign bits N(s1) and N(s2).

The exceptional quotient circuitry 60 selectively receives (a) the dividend and divisor sign bits N(s1) and D(s), and (b) the results of testing the computed first partial remainder PR1—PR1(s) and PR1(mag)—for all zeros or all ones. In addition, depending on whether the first or second exceptional quotient test EQ1/EQ2 is performed, the exceptional quotient circuitry will selectively (a) test a respective Q1 or Q2 flag, and (b) using the zero detect circuit 20, provide an indication of (i) whether PR1(mag) is all zeros, (ii) whether the 1's complement of PR1(mag) is all zeros (denoting that PR1(mag) is all ones), and (iii) whether the dividend low magnitude bits N(lomag) are all zeros.

For these exceptional cases, the result of each test is either an overflow or divide-by-zero signal, or in the case of the exceptional divisor and quotient tests, a legitimate quotient/remainder pair that finishes the computation. In either case, all overflow conditions can be signaled without requiring any iterative operations beyond computing the first partial remainder, thereby avoiding the delay associated with completing iterative divide operations that may still result in overflow conditions. Concomitantly, if the division operation is not exceptional, this fact can be signaled after computation of the first partial remainder, thereby signaling that the division operation will complete without causing an overflow (or divide-by-zero) exception.

FIG. 3 illustrates the exemplary early overflow detection logic, including the exceptional divisor circuitry 40, the exceptional dividend circuitry 50, and the exceptional quotient circuitry 60.

A latch network 31 is used to latch various values used by the exemplary early overflow detection logic in implementing early overflow detection—(a) the divisor sign D(s) is latched by a latch 32, and (b) the two dividend signs N(s1) and N(s2) are respectively latched by latches 33 and 34. The divisor sign D(s) and the dividend signs N(s1) and N(s2) are latched off source bus S0 when the divisor and dividend are loaded into the divisor and dividend registers (FIG. 1a, TMP2 13 and SUM/TMP1 12) at the beginning of a division operation.

The latched values D(s), N(s1), and N(s2) are (a) selectively used as inputs during early overflow detection, and (b) used to set flags that are selectively used during early overflow detection. An exceptional dividend (numerator) flag 36 is set if the two dividend signs N(s1) and N(s2) are different (i.e., [10] or [01]). A first exceptional quotient Q1 flag 37 is set if the divisor sign D(s) and the dividend sign N(s1) are the same (i.e., [00] or [11], while a second exceptional quotient Q2 flag 38 is set if D(s) and N(s1) are both negative (i.e., [11]).

3.1. Exceptional Divisor Circuitry

The exemplary exceptional divisor circuitry 40 uses a divide-by-zero circuit 41 and exceptional divisor control logic 42 to implement the exceptional divisor test. This test is performed at the start of the division operation when the divisor is loaded off the source bus S0 into the divisor register (FIG. 1a, 13).

When the divisor is loaded, the divisor sign D(s) is latched (latch 32) and the n−1 divisor magnitude bits D(mag) are input to the zero detector 20. Divide-by-zero circuit 41 determines if both D(s) and D(mag) are zero.

Concurrently with the divide-by-zero test, gate 43 in the exceptional divisor circuitry 40 receives the divisor sign D(s) from latch 32 and the output of the zero detector, and enables the exceptional divisor control logic 42 if D(s), is a one and the n–1 divisor magnitude bits are all zero. That is, for the exceptional divisor $-2^{n-1}$, the control logic is enabled to implement the control functions embodied in FIG. 2c to either (a) signal overflow, or (b) provide valid quotient/ remainder pairs using the input values N(hi) for the quotient and N(lomag) for the remainder, with appropriate complementation and remainder sign bit selection.

Referring to FIGS. 1a, 1b, and 3, note that at this stage of the division operation (before or during the computation of the first partial remainder), the values N(hi) and N(lomag) are contained in the SUM and TMP1 registers 12. If the exceptional divisor $-2^{n-1}$ is detected, then the exceptional divisor control logic 42 (FIG. 3) terminates the computation of the first partial remainder (if it has begun), and based on the control inputs either signals overflow, or controls the divide logic 11 (FIG. 1a) to provide a valid quotient/ remainder pair (with appropriate complementation being provided by the adder/subtracter 15).

Referring to FIGS. 2c and 3, the selection inputs are derived from the dividend. The two dividend sign bits N(s1) and N(s2) are latched, and available from latches 33 and 34. Note that if N(s1) and N(s2) are either [00] or [10], then the selection process is complete—in the [00] case a valid quotient/remainder pair is obtained, while in the [10] case overflow is signaled.

However, if N(s1) and N(s2) are [01] or [11], then additional information is required to complete the exceptional divisor test. Specifically, the exceptional divisor circuitry (a) causes the n–1 high order dividend magnitude bits N(himag) to be input to the zero detector 20, with the zero detect output being latched in latch 44, and (b) for the case [11], then causes the n–1 low order dividend magnitude bits N(lomag) to be input to the zero detector, with the zero detect output being latched in latch 46.

The N(himag) and N(lomag) values are available from the dividend registers (FIG. 1a, 12). Note that, even if the computation of PR1 is begun in parallel with the detection of whether the divisor magnitude bits are zero, i.e., prior to determining whether an exceptional divisor condition exists, N(himag) and N(lomag) bits are still available in the dividend registers (i.e., the first left shift shifts out only the most significant N(s1) bit).

For valid quotient/remainder pairs, where the quotient and remainder are available from the higher and lower order parts of the input dividend N(hi) and N(lomag), the exceptional divisor control logic enables the exceptional divisor circuitry to assign the appropriate signs to these quotients and remainders. In particular, valid quotients are either N(hi), or the two's or one's complement of N(hi), while the corresponding remainders have a 2's complement magnitude of N(lomag) with a sign bit corresponding by convention to the sign bit of the dividend (except for the special case of a zero remainder which by convention requires a sign bit of zero).

Referring to FIG. 1a, for the exemplary embodiment, the adder/subtracter 15 performs either one's or two's complementation. For exceptional divisors that yield valid quotient/ remainder pairs, the exceptional divisor circuitry terminates the iterative divide operation, and controls the routing of N(hi) through the adder/subtracter to selectively implement complementation to obtain the appropriately signed quotient in accordance with the exceptional divisor control logic (FIG. 2c).

As N(hi) is passed through the adder/subtracter, the N(lomag) value in the low order dividend register TMP1 is shifted up to the high order dividend register SUM, with the most significant bit of SUM being the sign bit specified by the exceptional divisor control logic. The appropriately complemented (or uncomplemented) N(hi) value output from the adder/subtracter is then routed back to the low order dividend register TMP1.

The net effect of this operation is that, as in the case of quotient/remainder pairs obtained by iterative operations, the quotient is in the low order dividend register TMP1 and the remainder is in the high order dividend register SUM. Note that for the case where the valid quotient is the uncomplemented N(hi), i.e., N(s1s2) are [01], N(hi) is routed through the adder/subtracter without complementation to position it in the low order TMP1 register.

The time-consuming test for whether N(himag) is zero can be conditioned on N(s2) being negative, and the time-consuming test for whether N(lomag) is zero can be conditioned on both N(s1) and N(s2) being negative—if either is performed as a result of an exceptional divisor condition, these zero detect operations will be used to complete the computation, and will be significantly less time consuming than completing the iterative operations to determine overflow or obtain a quotient/remainder pair for this exceptional divisor.

3.2. Exceptional Dividend Circuitry

If the n–1 D(mag) bits are not all zero, then the divisor is not exceptional, and the exceptional dividend test is performed to detect whether the dividend N is too large for any unexceptional divisor D.

Referring to FIG. 3, the exceptional dividend circuitry 50 includes a gate 52 that receives (a) the inverted output from the zero detector 20 (which input will be active if the input n–1 D(mag) bits are not all zero), and (b) the state of the exceptional dividend flag 36. If the exceptional dividend flag is set, indicating that the dividend sign bits N(s1) and N(s2) are not equal, and N(s1) is not the sign extension of N(s2), then overflow is signaled for this exceptional dividend and unexceptional divisor case.

For the exemplary embodiment, the order in which the exemplary divisor and exemplary dividend tests are performed is important. In particular, one exceptional dividend (where N(s1s2)=[01]) actually yields a valid quotient/remainder pair if the divisor is also exceptional—this case is detected by the exceptional divisor test.

3.3. Exceptional Quotient Circuitry

As described in Section 2.2, if N(s1) is the sign extension of N(s2), then the dividend is within the range over which valid quotients can be obtained—further overflow signaling depends on performing the exceptional quotient test (EQ1 or EQ2) to detect exceptional quotients where the dividend is too large relative to the divisor. These exceptional quotient tests are performed after the n-bit first partial remainder PR1 is computed.

Referring to FIG. 3, the exceptional quotient circuitry 60 includes a gate 61 that selects between two alternative exceptional quotient tests EQ1 and EQ2. Specifically, gate 61 tests whether the sign of the first partial remainder PR1(s) is the same as N(s2), i.e., whether in computing the first partial remainder PR1, the sign changes—(a) if the sign does not change, EQ1 is invoked which signals overflow, except for the exceptional quotient value $-2^{n-1}$ where it provides a final quotient/remainder pair, while (b) if the sign does change (indicating $|Q| \leq 2^{n-1}$), then EQ2 is invoked to detect the one additional remaining overflow condition ($Q=2^{n-1}$ with remainder zero).

Note that at this point if overflow has not been signaled by the exceptional divisor and exceptional dividend tests, the two dividend sign bits N(s1) and N(s2) are the same (sign extension), and N(s1) could be substituted for N(s2) as an input to gate 61.

From above, for the exemplary embodiment, when a divide operation is initiated by loading the dividend and divisor operands, the latch network 31 latches the two dividend signs N(s1) and N(s2) and the divisor sign D(s), and from these input values, determines two quotient flags Q1 37 (denoting nonnegative quotient) and Q2 38 (denoting negative divisor and negative dividend). Gate 61 determines which of the exceptional quotient tests EQ1 or EQ2 should be invoked.

If exceptional quotient test EQ1 is invoked denoting $|Q| \geq 2^{n-1}$, then this exceptional quotient test will complete the division operation as described in connection with FIG. 2b—associated arithmetic functions are performed using the divide logic in FIG. 1a (i.e., further partial remainder iterations are terminated). If the Q1 flag is set, indicating a nonnegative quotient (N(s1)=D(s)), overflow is immediately signaled by a gate 62—that is, with N(s1)=D(s), the quotient Q will be greater than or equal to $2^{n-1}$ which is overflow.

If the Q1 flag is not set (indicating a negative quotient), then the EQ1 test logic dictates that PR1 and N(lomag) are investigated to determine if overflow should be signaled, or if the legitimate quotient $-2^{n-1}$ with the appropriate remainder should be output. In particular, PR1 is tested to determine if it is all ones or all zeros. For the exemplary embodiment, the zero detector 20 is used to perform this operation: (a) if the sign bit PR1(s) is [0], then the n–1 PR1(mag) bits are input to the zero detector, while (b) if PR1(s) is [1], the n–1 PR1(mag) bits are first complemented, and then input to the zero detector for a determination if complement PR1(mag) is all zeros.

This operation is illustrated by gate 64 and complementation logic 65—for the exemplary embodiment, the complementation operation is actually performed by the adder/subtracter in the divide logic. Referring to FIG. 1a, after the computation of the first partial remainder, the resulting n bits of PR1 are fed back to the high order dividend register SUM—the exceptional quotient logic EQ1 causes the n–1 PR1(mag) bits to be passed through the adder/subtracter 15 for selective complementation and then routed to the SUM register 12 and then to the zero detector 20.

The resulting output of the zero detector 20 is latched into a PR1 test latch 66 for use in completing the first exceptional quotient test.

Referring to FIG. 3, if PR1 is not either all zero's or all one's, then the quotient Q will be less than or equal to $-(2^{n-1}+1)$, and overflow is signaled by gate 67.

If PR1 is either all zeros or all ones, then N(lomag) is used to determine whether (a) overflow should be signaled, or (b) a legitimate quotient/remainder pair can be provided. This function is illustrated by EQ1 test logic 68, and is described in Section 2.3 (FIG. 2b, 133, 134, 135, 136, and 137).

Referring to FIG. 1a, for the exemplary embodiment, the divide logic 11 is controlled to perform the computations embodied in the EQ1 test function. Specifically, these computations are performed using the SUM and TMP1 registers and adder/subtracter 15, with appropriate shifting. The n–1 N(lomag) bits are first shifted into the high order dividend register SUM, with the most significant bit being set to be the same as N(s1) and the TMP1 register being filled with n–1 low order zeros on this shift. Then the value in the SUM register is added to the divisor D from the TMP2 register, and a final negative or non-negative test (FIG. 2b, 134 or 137) selectively determines either overflow or the final result $Q=-2^{n-1}$ with the remainder being the current value in the SUM register (the non-negative test 137 includes a borrow-in of unity on the $C_{in}$ line). The TMP1 register sign bit is set to [1] to provide the value $Q=-2^{n-1}$ to finish the operation.

Referring to FIG. 3, if the second exceptional quotient test EQ2 is invoked (gate 61 implements operation 131 in FIG. 2b), then the Q2 flag is first tested and if set (indicating that the dividend sign N(s1) and divisor sign D(s) are both one), the EQ2 test is used to detect one final overflow condition. Specifically, if both PR1 and N(lomag) are all zeros, then the full 2n–1 bit first partial remainder is zero for quotient $2^{n-1}$, which is overflow.

For the exemplary embodiment, if the Q2 flag is not set, PR1 and N(lomag) are not tested, and the iterative divide operation proceeds normally to obtain a quotient/remainder pair without any possibility of overflow. Alternatively, PR1 and N(lomag) could still be tested to detect the quotient/remainder pair $Q=-2^{n-1}$ with a remainder of exactly zero.

For the exemplary embodiment, PR1 is tested using the zero detector, and the result stored in latch 66—the N(lomag) bits are then tested using the zero detector with the result stored in latch 46. The exceptional quotient circuitry 60 includes gate 69 to signal overflow if the state of latches 46 and 66 indicates that PR1 and N(lomag) are all zero.

Referring to FIG. 1a, the logic for exceptional quotient test EQ2 preferably is allowed to proceed in parallel with commencement of iterative partial remainder computations in divide logic 11. For the exemplary embodiment, the test for PR1 being all zeros is performed by testing PR1(s) and sending the n–1 low order bits from SUM to the zero detector 20 before the computation of PR2 results in a feedback into the SUM register (overwriting the PR1 value in that register). Similarly, N(lomag) should be sent to the zero detector before its leading bit is shifted to the SUM register in preparation for computing PR2. Alternatively, an additional n–1 bit latch may be used to store either of these values so as to avoid delaying commencement of iterative computation of the partial remainders which can be aborted if test EQ2 subsequently confirms overflow.

4. Early Signaling No Overflow

The exemplary early overflow detection implementation supports early signaling of a no overflow condition. Early signaling of no overflow is characterized in that, for the exemplary embodiment, no overflow can be signaled after at most two partial remainder computations (using the adder/subtracter 15 of FIG. 1a), in contrast to the subsequent large number of iterative add/subtract computations (approximately n–2 for the exemplary embodiment) to complete the division operation under no overflow conditions.

Signaling no overflow is useful such as pipelined computer systems to signal when a divide instruction will complete without causing an overflow exception, allowing instructions subsequently issued into the pipeline to proceed and retire even though the iterative partial remainder computations required to execute the divide instruction will take many additional clocks to complete.

Thus, the exemplary early overflow detection logic is able to either (a) signal a no overflow condition in which a valid quotient/remainder pair will be obtained by iterative partial remainder computations without any possibility of an overflow exception, or (b) signal overflow or provide a valid quotient/remainder pair for exceptional divisors, dividends, and quotients. In particular, the early overflow detection logic will provide valid quotient/remainder pairs for (a) all exceptional divisor values of $-2^{n-1}$, and (b) all exceptional quotient values of $-2^{n-1}$ (except, for the exemplary embodiment, the exceptional $Q=-2^{n-1}$ with $R=0$, for negative dividends and positive divisors, which is obtained using the iterative divide process).

FIG. 4 illustrates the exemplary no overflow signaling technique using a logic implementation 150 that corresponds to tILe logic blocks in FIGS. 2a and 2b that implement the no overflow signaling technique, namely 102, 112, 120, 131, and 141/142/143. The exemplary logic implementation of the no overflow signaling technique uses the corresponding gates in illustrated in FIG. 3.

Referring to FIGS. 2a and 2b, FIG. 3, and FIG. 4, the exemplary no overflow signaling technique relies on outputs from each of the early overflow detection tests: exceptional divisor, dividend, and quotient. Specifically, no overflow signaling is based on the following inputs: (a) the divisor sign and magnitude D(s) and D(mag), (b) the two bit sign field of the dividend N(s1s2), (c) and the sign and value of the first partial remainder PR1(s) and $N-2^{n-1}$ D (which is actually the concatenation of PR1 and the n–1 N(lomag-)bits).

From the exceptional divisor test, the determination that the divisor magnitude D(mag) is not equal to zero, illustrated by gate 151. This operation is illustrated in FIG. 2a (102), and is implemented in the exemplary early overflow detection logic of FIG. 3 by the inverted output of the n–1 zero detector 20.

From the exceptional dividend test, the determination that the dividend sign bits N(s1) and N(s2) are equal (sign extension), illustrated by gate 152. This operation is illustrated in FIG. 2a (112), and is implemented in the exemplary early overflow detection logic of FIG. 3 by the inverted output of exceptional dividend flag 36.

From the exceptional quotient test, the first determination is whether the exceptional quotient test EQ2 will be invoked rather than EQ1 (EQ1 will termirate the division operation by either signaling overflow or providing a quotient/remainder pair)—EQ2 will be invoked if the sign of the first partial remainder PR1(s) in not equal to the dividend sign bit N(s2), as illustrated by gate 153. This operation is illustrated in FIG. 2b (131), and is implemented in the exemplary early overflow detection logic of FIG. 3 by the inverted output of gate 61.

If the second exceptional quotient test EQ2 is invoked, then signaling a no overflow condition will depend on the determination that (a) the divisor and dividend are not both negative, or if they are, that (b) the first partial remainder value $N-2^{n-1}$ D is not equal to zero. These determinations are illustrated by gates 154, 155, and 156. This operation is illustrated in FIG. 2b (141, 142, 143), and is implemented in the exemplary early overflow detection logic of FIG. 3 by the Q2 flag and gate 69.

5. Conclusion

Although the Detailed Description of the invention has been directed to certain exemplary embodiments, various modifications of these embodiments, as well as alternative embodiments, will be suggested to those skilled in the art. For example, specific register structures, mappings, bit assignments, and other implementation details are set forth solely for purposes of providing a detailed description of the invention.

While the exemplary early overflow detection circuitry operates to detect and signal all overflow conditions prior to the computation of the second partial remainder, routine tradeoffs in the design of such circuitry may result in some delay in the completion of overflow detection and signaling, particularly when parallel concurrently with these tests.

Moreover, various modifications based on trade-offs between hardware and software logic will be apparent to those skilled in the art.

The invention encompasses any modifications or alternative embodiments that fall within the scope of the claims.

I claim:

1. An iterative division system for performing nonrestoring division of a 2n bit dividend N by an n bit divisor D to obtain an n-bit quotient Q and an n-bit remainder R (or signal overflow or divide by zero), with N, D, Q, and R being in 2's complement format, the division system signaling early a no-overflow condition when an iterative division operation will determine a quotient an remainder pair Q/R without overflow, such early no-overflow signaling being based on an input dividend N and an input divisor D, and a 2n–1 bit first partial remainder of value $[N-2^{n-1} D]$, comprising:

(a) iterative divide circuitry that receives the input dividend N and the input divisor D, where (i) the dividend N is characterized by a 2-bit sign field N(s1s2) formed by a first sign bit N(s1) and a second sign bit N(s2), a high order n–1 dividend magnitude bits N(himag), and a low order n–1 dividend magnitude bits N(lomag), such that N(s1) and N(himag) form a 2's complement number N(hi), and (ii) where the input divisor D is characterized by a leading sign bit D(s) and n–1 divisor magnitude bits D(mag);

(b) in a first operation, the iterative divide circuitry computes the difference between N(hi) and D to obtain an n-bit first partial remainder PR1 corresponding to the first n bits of the first partial remainder of value $[N-2^{n-1} D]$ including a leading sign bit PR1(s); and (c) no-overflow signaling logic that receives (i) the divisor sign and magnitude D(s) and D(mag), (ii) the two bit sign field of the dividend N(s1s2), (iii) and the first partial remainder of value $[N-2^{n-1} D]$ corresponding to PR1 and N(lomag);

(d) the no-overflow signaling logic including zero detect logic that detects whether both the divisor magnitude D(mag) and the first partial remainder are zero;

(e) the no-overflow signaling logic signaling a no-overflow condition if (i) the divisor magnitude D(mag) is not equal to zero and (ii) the divident sign bits N(s1) and N(s2) are equal, and (iii) the sign of the first partial remainder PR1(s) in not equal to the dividend sign bit N(s2), and (iv) the divisor and dividend are not both negative, or if they are, (v) the first partial remainder corresponding to PR1 and N(lomag) is not equal to zero.

2. The iterative division system of claim 1, further comprising divide-by-zero logic that signals a divide-by-zero condition if D(mag) and D(s) are both equal to zero.

3. An arithmetic processing system that performs nonrestoring division of a 2n bit dividend N by an n bit divisor D to obtain an n-bit quotient Q and an n-bit remainder R (or signal overflow or divide by zero), with N, D, Q, and R being in 2's complement format, the division system signaling early a no-overflow condition when an iterative division operation will determine a quotient an remainder pair Q/R without overflow, such early no-overflow signaling being based on an input dividend N and an input divisor D, and a $2n-1$ bit first partial remainder of value $[N-2^{n-1} D]$, comprising:

(a) iterative divide means for receiving the input dividend N and the input divisor D, where (i) the dividend N is characterized by a 2-bit sign field N(s1s2) formed by a first sign bit N(s1) and a second sign bit N(s2), a high order $n-1$ dividend magnitude bits N(himag), and a low order $n-1$ dividend magnitude bits N(lomag), such that N(s1) and N(himag) form a 2's complement number N(hi), and (ii) where the input divisor D is characterized by a leading sign bit D(s) and $n-1$ divisor magnitude bits D(mag);

(b) in a first operation, the iterative divide means computing the difference between N(hi) and D to obtain an n-bit first partial remainder PR1 corresponding to the first n bits of the first partial remainder of value $[N-2^{n-1} D]$ including a leading sign bit PR1(s); and (c) no-overflow signaling means for receiving (i) the divisor sign and magnitude D(s) and D(mag), (ii) the two bit sign field of the dividend N(s1s2), (iii) and the first partial remainder of value $[N-2^{n-1} D]$ corresponding to PR1 and N(lomag);

(d) the no-overflow signaling means including zero detect means for detecting whether both the divisor magnitude D(mag) and the first partial remainder are zero;

(e) the no-overflow signaling means signaling a no-overflow condition if (i) the divisor magnitude D(mag) is not equal to zero, and (ii) the dividend sign bits N(s1) and N(s2) are equal, and (iii) the sign of the first partial remaidner PR1(s) in not equal to the dividend sign bit N(s2), and (iv) the divisor and dividend are not both negative, or if they are, (v) the first partial remainder corresponding to PR1 and N(lomag) is not equal to zero.

4. The arithmetic processing system of claim 3, further comprising divide-by-zero means afor signaling a divide-by-zero condition if D(mag) and D(s) are both equal to zero.

5. A method for performing nonrestoring division using an adder that performs addition, subtraction, and complementation operations, iteratively dividing a 2n bit dividend N by an n-bit divisor D to compute an n bit quotient Q and an n bit remainder R (or signal overflow or divide by zero), where N, D, Q, and R are in 2's complement format, the method including signaling early a no-overflow condition when an iterative division operation will complete without overflow, such early no-overflow signaling being based on an investigation of an input dividend N and an input divisor D, and the result of the computation of a $2n-1$ bit first remainder of value $[N-2^{n-1} D]$, comprising the steps:

(a) computing, from the input divisor D and the input dividend N, using the adder, an n-bit first partial remainder PR1 corresponding to the first n bits of the first partial remainder of value $[N-2^{n-1} D]$ including a leading sign bit PRI(s), where the low order $n-1$ bits of N are the low order $n-1$ bits of such first partial remainder of value $[N-2^{n-1} D]$;

(b) generating a D(mag)-zero indication of whether the divisor magnitude field D(mag) is zero;

(c) generating a PR-zero indication of whether the first partial remainder of value $[N-2^{n-1} D]$ is zero; and (d) generating a no-overflow signal from (i) selected sign bits of the input dividend N, (ii) a sign bit of the divisor D, (iii) a sign bit of the first partial remainder, (iv) the divisor-zero indication, and (v) the PR-zero indication;

(e) such that, when the no-overflow signal is asserted, a subsequent plurality of iterative partial remainder computations are performed using the adder to obtain the quotient Q and remainder R with no possibility of overflow.

6. The method of claim 5, further comprising the step of signaling a divide-by-zero condition if D(mag) and D(s) are both equal to zero.

\* \* \* \* \*